United States Patent [19]

Carney et al.

[11] Patent Number: 4,515,636

[45] Date of Patent: May 7, 1985

[54] REINFORCED CEMENT

[75] Inventors: Thomas E. Carney; Allan R. Champion, both of Wilmington; Francis M. Logullo, Sr., Hockessin, all of Del.

[73] Assignee: E. I. Du Pont de Nemours and Company, Wilmington, Del.

[21] Appl. No.: 641,860

[22] Filed: Aug. 17, 1984

[51] Int. Cl.³ .............................. C04B 7/02; C04B 7/35
[52] U.S. Cl. ...................................... 106/90; 428/375
[58] Field of Search ............................................ 106/90

[56] References Cited

U.S. PATENT DOCUMENTS

| 3,971,743 | 7/1976 | Breslow | 260/3.3 |
| 4,363,666 | 12/1982 | Johnson et al. | 106/90 |
| 4,416,695 | 11/1983 | Ball et al. | 106/90 |

FOREIGN PATENT DOCUMENTS

| 943729 | 3/1974 | Canada | 106/90 |
| 58-120811 | 5/1980 | Japan . | |
| 98383 | 7/1961 | Netherlands | 106/90 |
| 2021552 | 7/1982 | United Kingdom . | |

OTHER PUBLICATIONS

Hercules® Bulletin OPD-21B.
Hercules® Azide Chemicals Bulletin OPD-26 pp. 1,3,5,7,9.
Research Disclosure "Cementitious Product Reinforcement with Acrylic Fibers" p. 313, Item 23439, Oct. 1983.
Abstract of Japanese Appln. NS 62832/80.
Abstract of Japanese Appln. NS-138422/78.
Abstract of Japanese Appln. NS 155222/79.

*Primary Examiner*—Arthur P. Demers

[57] ABSTRACT

Cement product reinforced with p-aramid or acrylic fiber coated with certain sulfonyl azides.

7 Claims, No Drawings

REINFORCED CEMENT

BACKGROUND OF THE INVENTION

Asbestos cement construction materials have been known and widely used. Such materials include roofing titles, corrugated sheets, interior and exterior building panels, and asbestos cement pipes. In recent years the asbestos cement industry has been attempting to find replacements for asbestos fibers becuase of the growing health concerns associated with asbestos and because reserves of the forms of this natural material suitable for cement reinforcement are being depleted and prices are increasing.

A variety of synthetic organic fibers such as acrylics, polyvinyl alcohol, aramids, polyolefins and the like are being evaluated by the asbestos cement industry. Two of the primary requirements for an asbestos replacement fiber are high modulus or stiffness and good adhesion to cement. Aramid fibers, for example, have high moduli (<400 gpd) but increased adhesion is desirable. The subject of the present invention is a fiber coating which greatly enhances fiber/cement adhesion and significantly improves the strength of the resulting fiber reinforced cement products.

SUMMARY OF THE INVENTION

A fiber-cement product comprising a cement matrix reinforced with fibers selected from the group consisting of p-aramid and acrylic fiber, said fiber being coated with a sulfonyl azide of the formula

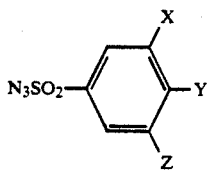

where X, Y and Z, which may be the same or different, are selected from the group consisting of hydrogen, carboxyl and hydroxyl, with the proviso that at least one but not all of X, Y and Z is hydrogen, said coating being in an amount sufficient to improve adhesion of the fiber to the cement matrix. The coated fiber is present in the product in the amount of 0.5 to 4 weight percent and preferably in the amount of 1 to 2 weight percent.

DETAILED DESCRIPTION OF THE INVENTION

Fiber suitable for cement reinforcement in accordance with the present invention is p-aramid fiber and acrylic fiber.

The term "aramid" is used to designate wholly aromatic polyamides. Not all aramid fibers are useful in the present invention but only those derived from aromatic polyamides whose chain extending bonds are either coaxial or parallel and oppositely directed. High strength, high modulus aramid fibers useful in the present invention may be prepared by the processes described in U.S. Pat. Nos. 3,767,756 and 3,869,430. The fibers are characterized by filament tenacities of at least 18 gpd and moduli of at least 400 gpd. These fibers will be referred to hereinafter as p-aramid fibers. Particularly preferred are p-aramid fibers based on poly(p-phenylene terephthalamide) as produced by Du Pont under the trademark Kevlar ®.

The acrylic fibers useful in the invention are polyacrylonitrile and copolymers containing at least 85 mol % acrylonitrile.

The above fibers are coated with any of a select group of sulfonyl azides for improved fiber/cement adhesion. The sulfonyl azides are of the formula.

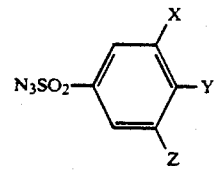

wherein X, Y and Z, which may be the same or different, are selected from the group of hydrogen, carboxyl and hydroxyl, with the proviso that at least one but not all of X, Y and Z is hydrogen, and are applied to the fiber in an amount sufficient to improve the adhesion of the fiber to the cement matrix. In general it is found that from 1 to 2% of azide coating based on the weight of the fiber produces the desired result. Typical azide compounds useful in this invention are: p-carboxybenzene sulfonyl azide, m-carboxybenzenesulfonyl azide, p-hydroxybenzenesulfonyl azide, and 3-carboxy-4-hydroxybenzenesulfonyl azide.

The azide coated fibers are incorporated in the cement matrix by conventional techniques, usually in the amount of from 0.5 to 4 weight percent.

Cements in the present invention include a wide range of hydraulically setting binder materials such as Portland cement, high alumina cement, calcium silicates formed on autoclave treatment of cement and the like.

The cements may contain numerous additives which have a beneficial effect on strength, pore structure or processing behavior of the cement binder material. Possible additives include fumed silica, fly ash, ground quartz, blast furnace slag, pozzolanas, and the like.

PREPARATION OF COATED FIBERS

The sulfonyl azide compounds shown in Table I are evaluated in the examples below.

TABLE I

| Item | Compound | Formula |
| --- | --- | --- |
| 1. | p-carboxybenzenesulfonyl azide | $N_3SO_2$—⟨⟩—COOH |
| 2. | m-carboxybenzenesulfonyl azide | $N_3SO_2$—⟨⟩—COOH |
| 3. | p-hydroxybenzenesulfonyl azide | $N_3SO_2$—⟨⟩—OH |

Solutions (concentration of 75 g/l) of the desired sulfonyl azides are prepared by dissolving in a suitable solvent such as acetone or isopropyl alcohol. Continuous yarns are coated with azide solution by passing the yarns over a slotted coating head at 50 yd/min and metering the solutions onto the yarn through a metering pump to produce the desired coating levels. After passing over the coating head the yarns are wound on perforated metal bobbins, and the solvent allowed to evaporate. Coating levels up to 2% by weight are employed.

The bobbins of yarn are then heat treated in air to bond the sulfonyl azide to the synthetic fiber. Heat treatment consists of placing the yarns, on perforated bobbins, into a circulating air oven. The coated yarn for the first 3 samples of Example 1, Table II, are heated at 160°–190° C. for 30–40 minutes and removed from the oven. The yarns of the remaining examples of Table II were subjected to a slower cure cycle by placing them in an oven at room temperature and gradually raising the temperature to 120°–140° C. during eight hours. The yarns are then allowed to remain at constant temperature in the oven overnight, and the following day the temperature is raised to 150°–185° C. in four to six hours.

PROCEDURE FOR PREPARATION OF CEMENT COMPOSITES

For evaluation purposes, fiber reinforced cement composites are prepared which contained 200 gm of Portland cement, 4 to 5 gm of synthetic organic fiber (with or without sulfonyl azide coating) and 8 gm of newspaper pulp. The pulp is first prepared by dispersing 8 gm of newsprint papter for two minutes in 500 cc of water containing 1 gm of 0.1% solution of a flocculating agent (Separan AP-273 manufactured by Dow Chemical Company) using a blender. Four to 5 gm of synthetic organic fibers cut to a length of 6 mm are dispersed for five minutes in approximately 6l of water containing 3 gm of the flocculating solution by use of a vibrating laboratory stirrer. The newspulp dispersion was then added to the synthetic fiber preparation. 200 gm of Type I Portland cement are then mixed in 1l of water and added to the fiber/pulp mixture. The entire slurry is then cast into a sheet 33 cm × 33 cm and approximately 1.5–2 mm thick by pouring into a standard Deckle box paper making mold and dewatering. The resulting sheet is then folded into four layers, trimmed to 15.2 × 15.2 cm and pressed in a mold for 30 minutes at 1670 to 2220 psi. The resulting cement sample is then removed from the mold and cured for 28 days in a 100% relative humidity environment. The cement tile is cut into strips 2.54 cm wide with a diamond saw. The strips are dried overnight at 60° C. and tested in 3-point bending to determine flexural strength.

FLEXURAL TESTING OF CEMENT COMPOSITES

Fiber reinforced cement composites were evaluated by determining flexural strength (also called Modulus of Rupture or MOR). The test is described in ASTM D-790. Flexural testing is used frequently by the asbestos cement industry as a measure of product performance for sheet products such as roofing tiles, building panels, etc. 2.54 cm × 15.2 cm × 0.5 cm samples prepared as described above were tested according to the above ASTM method in 3-point bending in a Instron test machine. A span of 7.6 cm was used in all cases. Test specimens are loaded to failure, and the maximum stress level observed during the test is taken as the flexural strength or MOR. Control samples containing uncoated synthetic organic fibers, and identical samples containing fibers with sulfonyl azide coatings, are tested in this way to determine the effect of coating on composite strength.

EXAMPLES

The following examples serve to illustrate the benefits of sulfonyl azide coatings on fibers used for cement reinforcement. Test results for each example are shown in Table II. Tenacity (T) and modulus (M) are reported in grams per denier while elongation (E) is reported in percent.

EXAMPLE I

P-aramid yarns (1500 denier, 1000 filament, T/E/M=22.5/5/490) were coated with the three sulfonyl azides shown in Table I by the procedure described above and were cut into 6 mm staple lengths. Cement composites containing 5 gm of the coated fiber, 8 gm wood pulp and 200 gm cement were prepared according to the above procedure, and the flexural strengths were measured and compared in Table II. Control samples containing uncoated p-aramid fibers had strengths of 29.8–30.6 MPa. When fibers containing 2.0–2.2 wt % coatings of sulfonyl azides were used, significant strength improvements were observed. In particular sulfonyl azides, Items 1 and 2 produced cement samples with strengths as high as 40.2 to 44.5 MPa (megapascals). Sulfonyl azide, Item 1 at the 1.3% coating level gave measurable but less dramatic strength improvement.

EXAMPLE 2

P-aramid yarns (1420 denier, 1000 filament, T/E/M=21.7/2.5/976) were coated with sulfonyl azides Items 1 and 2 by the above procedure and were cut into 6 mm staple. Reinforced cement composites were prepared which contained 5 gm of the coated fiber, 8 gm wood pulp and 200 gm cement as described above. A control sample of identical composition with no coating on the p-aramid fibers was also prepared. As shown in Table II the strength of the control sample was 28.6 MPa, while samples containing fibers with coatings Items 1 and 2 had significantly higher strengths of 35.5 MPa and 46.3 MPa at coating levels of 1.4 and 2.1 wt % respectively.

EXAMPLE 3

An acrylic fiber (T/E/M=5.9/12.9/137) was coated with 2.0 wt % of sulfonyl azide Item 1 and cut into 6 mm staple length. The fiber is essentially an acrylonitrile copolymer with methylacrylate (about 6 mol %). A cement composite containing 4 gm of the acrylic fiber, 8 gm wood pulp and 200 gm cement was prepared as described above and its strength was determined and compared to control samples containing identical amounts of uncoated acrylic fiber. The composite containing the coated fiber had a flexural strength of 29.7 MPa compared to 23.0–24.4 MPa for the control samples.

TABLE II

Test Results for Cement Composites Reinforced with Sulfonyl Azide Coated Fibers

| Sulfonyl Azide Item* | Coating Level (wt %) | Flex Strength (MPa) |
|---|---|---|
| Example 1 | | |
| Controls | — | 0 | 29.8–30.6 |
| 3 | 2.0 | 35.0 |
| 1 | 2.0 | 44.5 |
| 1 | 2.0 | 38.3 |
| 1 | 1.3 | 32.6 |

TABLE II-continued

Test Results for Cement Composites
Reinforced with Sulfonyl Azide Coated Fibers

| Sulfonyl Azide Item* | Coating Level (wt %) | Flex Strength (MPa) |
| --- | --- | --- |
| 2 | 2.0 | 40.2 |
| Example 2 | | |
| Control | — | 0 | 28.6 |
| 2 | 2.1 | 46.3 |
| 1 | 1.4 | 35.5 |
| Example 3 | | |
| Controls | — | 0 | 23.0–24.4 |
| 1 | 2.0 | 29.7 |

*From Table I

We claim:

1. A fiber-cement product comprising a cement matrix reinforced with fibers selected from the group consisting of p-aramid and acrylic fiber, said fiber being coated with a sulfonyl azide of the formula

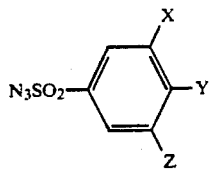

where X, Y and Z, which may be the same or different, are selected from the group consisting of hydrogen, carboxyl and hydroxyl, with the proviso that at least one but not all of X, Y and Z is hydrogen, said coating being in an amount sufficient to improve adhesion of the fiber to the cement matrix.

2. The product of claim 1 wherein the coated fiber is present in an amount of from 0.5 to 4 weith percent.

3. The product of claim 2 wherein the coated fiber is present at about 1 to 2 weight percent.

4. The product of claim 1 wherein the fiber is coated with from 1 to 2 percent by weight of the sulfonyl azide.

5. The product of claim 1 wherein the sulfonyl azide is p-carboxybenzenesulfonyl azide.

6. The product of claim 1 wherein the sulfonyl azide is m-carboxybenzenesulfonyl azide.

7. The product of claim 1 wherein the sulfonyl azide is p-hydroxybenzenesulfonyl azide.

* * * * *